United States Patent
Lutz et al.

(10) Patent No.: US 6,626,115 B2
(45) Date of Patent: Sep. 30, 2003

(54) GAS GENERATOR

(75) Inventors: Harald Lutz, Buchbach (DE); Oskar Sponfeldner, Mühldorf (DE); Georg Schönhuber, Oberneukirchen (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 09/780,750

(22) Filed: Feb. 9, 2001

(65) Prior Publication Data

US 2001/0013300 A1 Aug. 16, 2001

(30) Foreign Application Priority Data

Feb. 11, 2000 (DE) ..................... 200 02 377 U

(51) Int. Cl.⁷ ............................................. B60R 21/26
(52) U.S. Cl. ...................... 102/530; 280/741
(58) Field of Search ................. 102/530, 531; 280/736, 741

(56) References Cited

U.S. PATENT DOCUMENTS

| | | | | |
|---|---|---|---|---|
| 3,810,655 A | * | 5/1974 | Prachu ................. | 102/530 |
| 5,149,129 A | | 9/1992 | Unterforsthuber et al. | |
| 5,471,932 A | * | 12/1995 | Kraft et al. ............ | 102/531 |
| 5,857,699 A | * | 1/1999 | Rink et al. ............. | 280/737 |
| 5,951,041 A | * | 9/1999 | Iwai et al. ............. | 280/741 |
| 6,095,561 A | * | 8/2000 | Siddiqui et al. ........ | 280/741 |
| 6,189,927 B1 | * | 2/2001 | Mossi et al. ........... | 280/741 |
| 6,314,888 B1 | * | 11/2001 | Muller et al. .......... | 102/530 |

FOREIGN PATENT DOCUMENTS

| | | |
|---|---|---|
| DE | 4019877 | 12/1992 |
| DE | 4310853 | 10/1994 |
| DE | 4324554 | 1/1995 |
| DE | 19541584 | 5/1997 |
| DE | 19611102 | 9/1997 |
| DE | 19757478 | 6/1999 |
| EP | 0733519 A2 | 9/1996 |
| EP | 0755748 A2 | 1/1997 |
| EP | 0841225 A1 | 5/1998 |
| EP | 0870651 | 10/1998 |
| WO | WO9942339 | 8/1999 |

* cited by examiner

Primary Examiner—Harold J. Tudor
(74) Attorney, Agent, or Firm—Tarolli, Sundheim, Covell & Tummino L.L.P.

(57) ABSTRACT

The invention relates to a gas generator comprising at least two combustion chambers filled with propellant charges and delimited by combustion chamber walls. The combustion chamber walls have outflow openings which in a non-activated state are closed by at least one applied membrane having an edge. One of an additional fastening device and a protective device is provided at least sections of the edge of the membrane. The device prevents a coming-off of the membrane from the combustion chamber wall.

9 Claims, 5 Drawing Sheets

GAS GENERATOR

TECHNICAL FIELD

The invention relates to a gas generator comprising at least two combustion chambers.

BACKGROUND OF THE INVENTION

In such gas generators, which may be designed as multiple-stage gas generators, one or more propellant charges are ignited, in order to be able to generate different quantities of gas. If not all of the propellant charges are to be ignited, a so-called ignition transfer must be prevented. The igniting of a propellant charge must not in fact lead to an auto-ignition of the other propellant charge, for example by generated hot gas flowing into the combustion chamber of the propellant charge which is not to be activated. So that this is ruled out, the outflow openings in the combustion chambers are usually closed by membranes, preferably metal foils. The metal foils are constructed such that they are only destroyed by the associated propellant charge, but withstand a destruction owing to the flow of gas and particles on igniting of another propellant charge. At the same time, the membrane can also serve for the hermetic sealing of the combustion chamber, so that no humidity can penetrate into the combustion chamber. So that the generator remains capable of functioning over a period of years, it must be ensured that the membrane remains fastened to the combustion chamber wall. Also on igniting of a propellant charge, the membrane of a propellant charge which is not to be ignited must in no way detach itself from the combustion chamber in the region of its edge, otherwise a stream of gas would arrive into the combustion chamber and ignite the propellant charge.

BRIEF SUMMARY OF THE INVENTION

The invention provides a gas generator in which an ignition transfer can be avoided even more reliably. This is achieved in a gas generator which comprises at least two combustion chambers filled with propellant charges and delimited by combustion chamber walls. The combustion chamber walls have outflow openings which in a non-activated state are closed by at least one applied membrane having an edge. One of an additional fastening device and a protective device is provided at least sections of the edge of the membrane. The device prevents a coming-off of the edge of the membrane from the combustion chamber wall. The additional fastening device or the protective device prevents the edge from coming off owing to the stresses which are produced by the gas stream of an ignited propellant charge.

Preferably the membrane is fastened on the side of the combustion chamber wall facing away from the propellant charge. In this embodiment the membrane is not provided in the combustion chamber but outside it, so that the edge of the foil is pressed against the wall by the pressure stress and flow stress on igniting a propellant charge which is not associated with the membrane, and is not peeled off from it.

The fastening or protective device is arranged on the outer side of the membrane, in order to protect the edge of the membrane from the gas stream.

According to one embodiment, the fastening device is an adhesive applied from outside to the edge of the membrane, for example a metal adhesive.

According to another development, a protective foil is fastened externally on the edge of the membrane, the fastening devices always having to extend beyond the edge of the membrane so that it is also actually protected.

The protective foil can be a ductile metal foil which can be easily adapted to the geometric characteristics.

If the membrane is likewise of metal, the protective foil can be fastened to the membrane by welding.

Another embodiment makes provision for constructing the protective device as a depression in the combustion chamber wall, into which depression the edge of the foil is pressed and which thereby can not be caught directly by the gas stream, because it lies in the depression which is protected from flow.

The protective device can, furthermore, also be a projection of the combustion chamber wall, which runs along the edge so as to adjoin the edge. Also in this development, the projection serves to not expose the edge directly to the gas stream. The projection serves as a flow deflector.

According to a further embodiment, the membrane is open in peripheral direction and has peripheral ends. The protective device consists in that the end wall is chamfered or rounded. This design, which is favorable to flow, protects the end wall of the membrane from the gas stream.

DETAILED DESCRIPTION OF THE PREFERRED EMBODIMENTS

Figure 1:
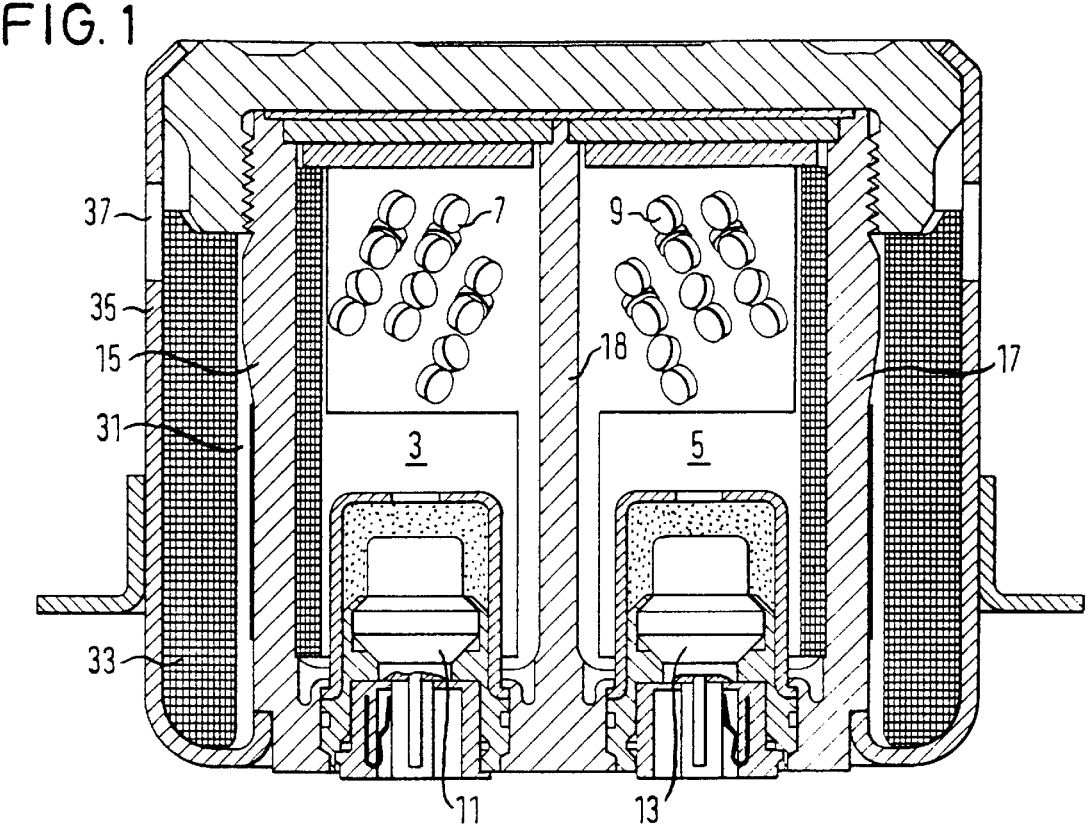
FIG. 1 shows a longitudinal sectional view through a two-stage gas generator according to the invention.

In FIG. 1 a two-stage gas generator is illustrated, which has a first and a second combustion chamber 3 and 5, respectively, with a corresponding first and a corresponding second propellant charge 7 and 9, respectively. The propellant charges 7, 9 have associated igniters 11 and 13, respectively, so that the propellant charges 7, 9 can be ignited individually and independently of each other. Each combustion chamber 3, 5 is delimited externally by an associated combustion chamber wall 15 and 17, respectively.

Figure 2:
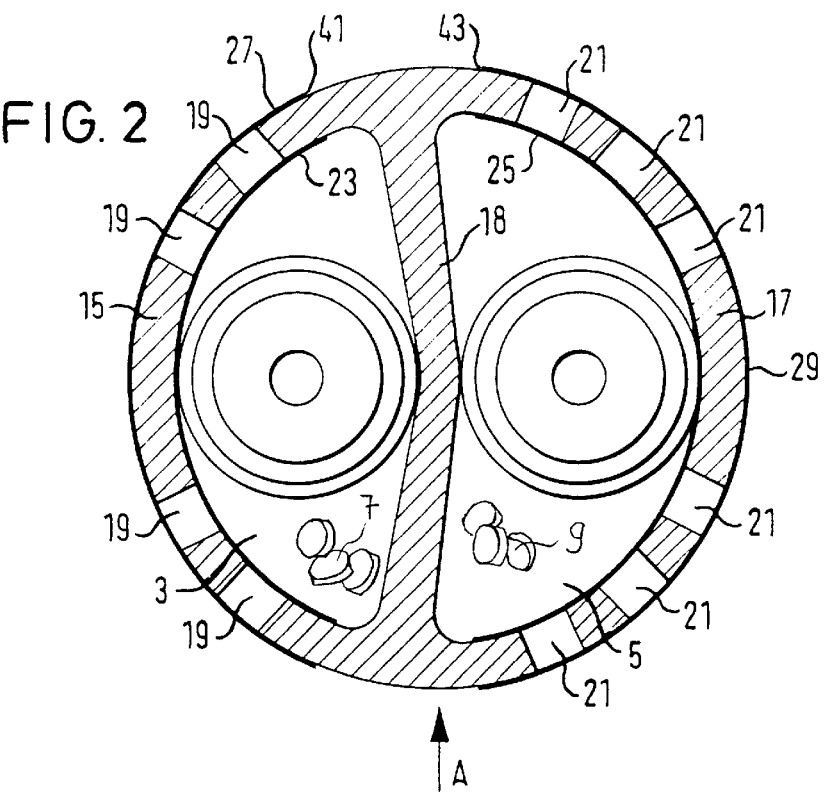
FIG. 2 shows a cross-sectional view through the combustion chamber insert of the gas generator according to FIG. 1 in accordance with a first embodiment.

As can be seen from FIG. 2, the two combustion chamber walls 15, 17 continue into each other and complement each other to form a circular cylinder. A common inner combustion chamber wall 18 forms a connecting cross-piece between substantially opposite sections of the circular cylinder and separates the two combustion chambers 3, 5. The combustion chamber walls 15, 17, 18, which are connected with each other in one piece, form a combustion chamber insert which is illustrated in FIGS. 2 to 7 in various embodiments. In the outer combustion chamber walls 15, 17 numerous outflow openings 19 and 21, respectively, are provided. On the inner side of each combustion chamber wall 15, 17, associated with the propellant charge, in each case there lies a sealing foil 23 and 25, respectively, which closes the outflow openings 19 and 21, respectively, and provides for a sealing of the corresponding combustion chamber 3, 5.

On the outer side of each combustion chamber 15, 17 facing away from the propellant charge in addition in each case a membrane 27 and 29, respectively, is fastened to the combustion chamber wall 15, 17, which in addition closes the outflow openings 19 and 21, respectively. The two membranes 27, 29 likewise serve for sealing the combustion chambers 3, 5 and in addition serve to prevent a so-called ignition transfer, which is explained in further detail hereinbelow.

Radially externally a common filter chamber 31, in the form of a circular ring and closed peripherally, adjoins the combustion chamber walls 15, 17, in which filter chamber a filter 33 in the form of a circular ring is arranged. An outer housing 35 with outflow openings 37 closes off the gas generator externally.

When only one propellant charge 7 or 9 is to be ignited, this destroys the associated insulation foil 23, 25 and the associated membrane 27 or 29, so that the gas arrives via the outflow openings 19 or 21 into the filter chamber 31. As the generated gas and the generated hot particles are then distributed uniformly in the filter chamber 31, which is closed peripherally, the gas stream or the hot particles could lead to the destruction of the membrane, which is associated with that propellant charge which is not to be activated. Each membrane 27, 29 therefore has to be constructed so as to be so stable that it is not destroyed on igniting of the propellant charge which is not associated with it. The membranes 27, 29 are therefore usually of a metal foil, for example a steel foil which is bonded across a large area to the associated combustion chamber wall, the adhesive being provided between the membrane and the combustion chamber wall.

Through the gas stream, the edges of the membrane 27, 29 are exposed to high stresses which could lead to the membranes coming off from the associated combustion chamber wall in peripheral direction, i.e. in particular at their axially running edges 41 and 43, respectively.

Figure 3:
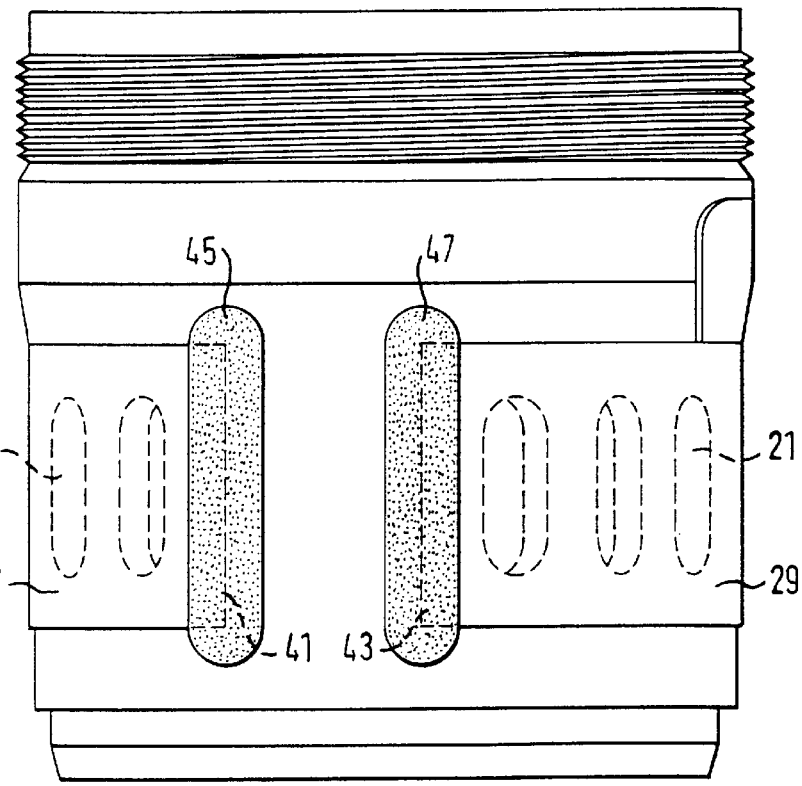
FIG. 3 shows a side view of the combustion chamber insert of the gas generator according to FIG. 2, as viewed in the direction of the arrow A.

In order to prevent a coming-off of the membranes 27, 29 in the region of their axial edges 41, 43, additional fastening- or protective devices are provided, which are explained in further detail hereinbelow. In FIG. 3 it is shown that in the region of the edges 41, 43 externally an adhesive in the form of a metal adhesive is applied to the membrane 27, 29. Thereby, two strip-shaped adhesive sections 45, 47 are produced, which completely cover the transition of the axial edges 41, 43 to the combustion chamber walls 15, 17. Thus, the adhesive protects here the axial edges 41, 43 from hot gas flowing directly against them. A metal adhesive which is known under the commercial name Loctite® 3450 is used as the preferred adhesive for this.

Figure 4:
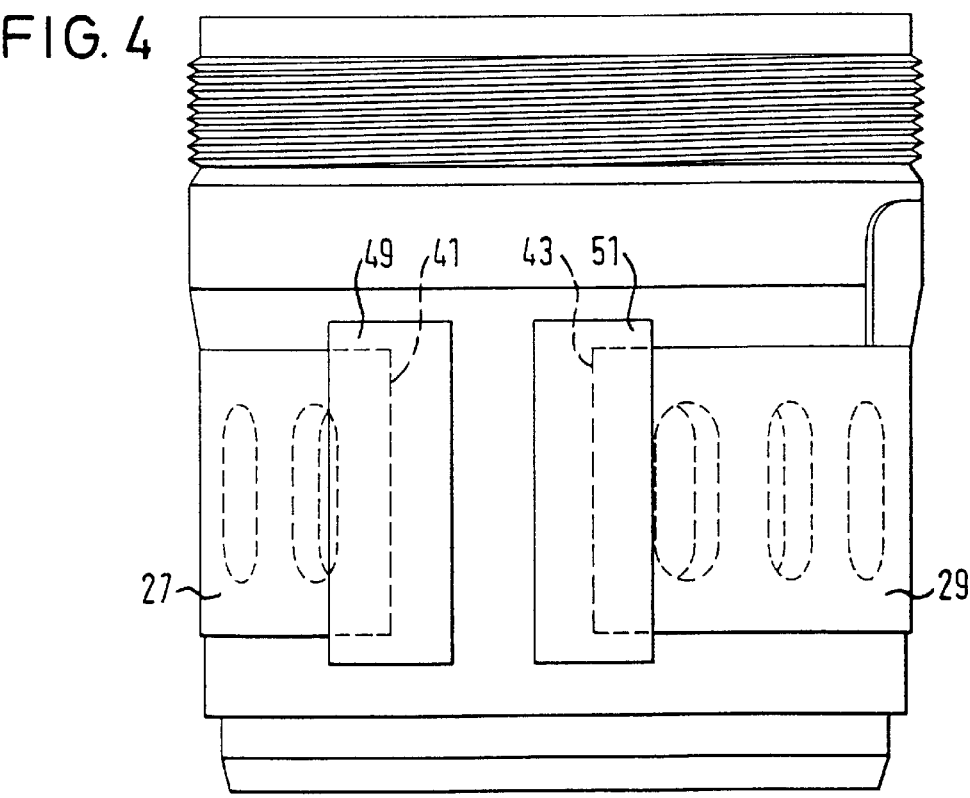
FIG. 4 shows a side view of the combustion chamber insert of the gas generator according to a second embodiment.
Figure 5:
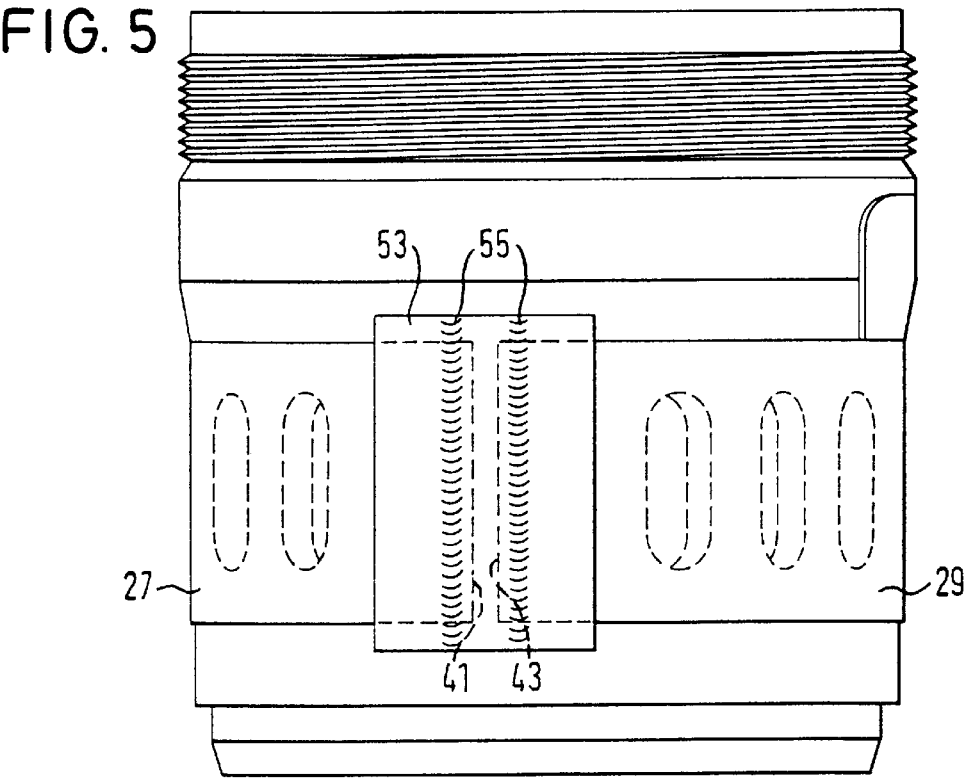
FIG. 5 shows a side view of the combustion chamber insert of the gas generator according to a third embodiment.

Instead of the adhesive, as FIG. 4 shows, also protective foils 49, 51 preferably of easily deformable metal can be provided, which cover the axial edges 41, 43. The protective foils 49, 51, which are preferably of ductile metal foil which can be readily adapted to the contour of the bonded membrane ends, are either self-adhesive or can be fastened for example by means of an adhesive to the membranes 27, 29 and to the combustion chamber walls 15, 17.

A common protective foil 53 can also be provided (FIG. 5), which covers the adjacent axial edges 41, 43. The protective foil 53 is fastened by welding to the combustion chamber wall, the weld seams 55 running across the membranes 27, 29 and being welded therewith. The weld seams extend in axial direction but also beyond the membrane 27, 29, so that the protective foil 53 is connected directly with the combustion chamber wall.

Figure 6:
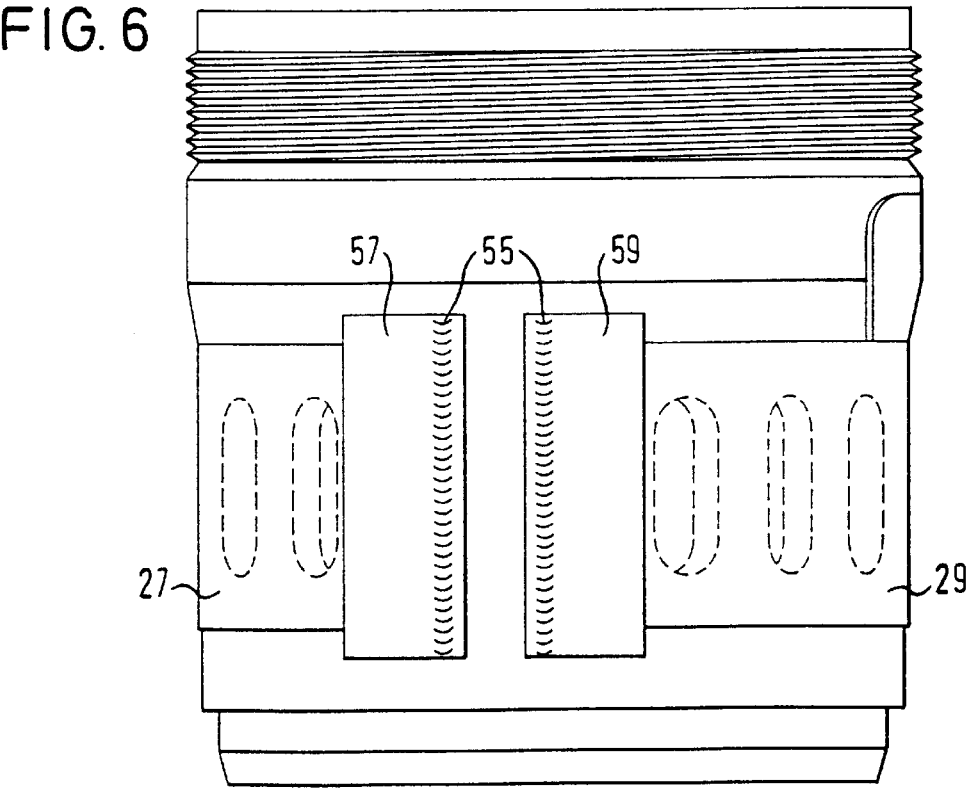
FIG. 6 shows a side view of the combustion chamber insert of the gas generator according to a fourth embodiment.

Instead of a common protective foil 53, two protective foils 57, 59, as is illustrated in FIG. 6, of metal, for example copper, can also be fastened by welding to the combustion chamber wall and/or the membrane 27 or 29. The protective foils 57, 59 are so thin and ductile that they can easily be adapted to the shape of the combustion chamber wall and to the membrane 27, 29 lying therebeneath by pressing thereagainst.

Figure 7:
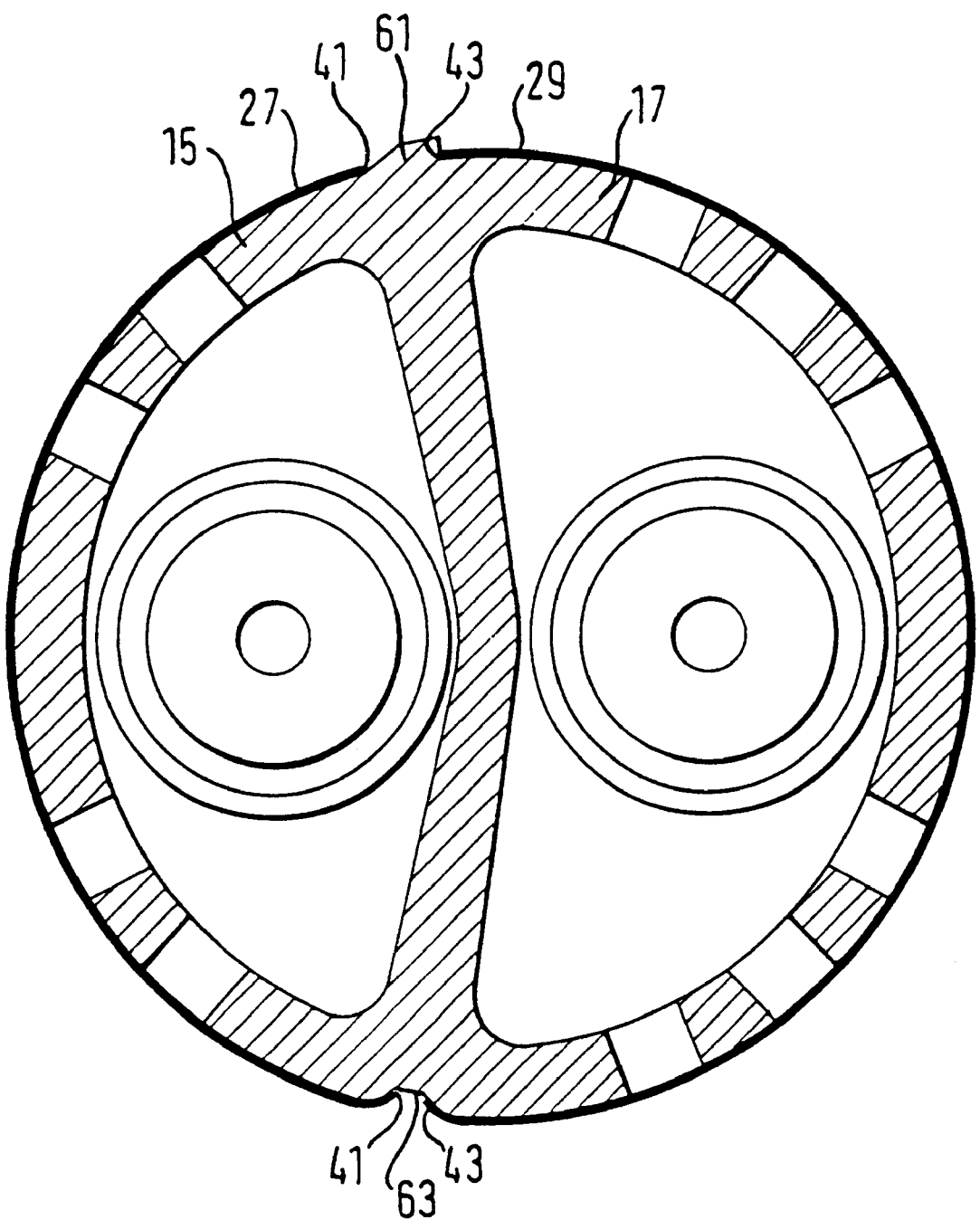
FIG. 7 shows a cross-sectional view through a combustion chamber insert of the gas generator, the upper half showing a fifth embodiment and the lower half showing a sixth embodiment of the invention.

According to the cross-sectional view of the combustion chamber insert illustrated in FIG. 7, no additional fastening device such as an adhesive or a protective foil is applied from outside to the membrane 27, 29, but rather so-called protective devices are provided, which are intended to prevent the axially running edges 41, 43 from being directly impinged by the gas flow.

In the upper half of the section shown in FIG. 7, at the transition of the combustion chamber walls 15, 17 a projection 61 is provided, protruding radially outwards and extending across the entire axial width of the membrane 27, 29, which projection 61 is formed on the combustion chamber wall. The projection 61 serves for gas deflection so that, as the edges 41, 43 lie directly against the projection 61, these are not directly impinged by the gas flow in peripheral direction, if only one propellant charge is ignited. The edges 41, 43 lie as it were in lee regions of the projection 61.

The same purpose of protection from being directly impinged by the gas flow is also fulfilled by a protective device in the form of a depression 63, which runs axially and into which the edges 41, 43 are pressed, as is illustrated in the lower half in FIG. 7.

Figure 8:
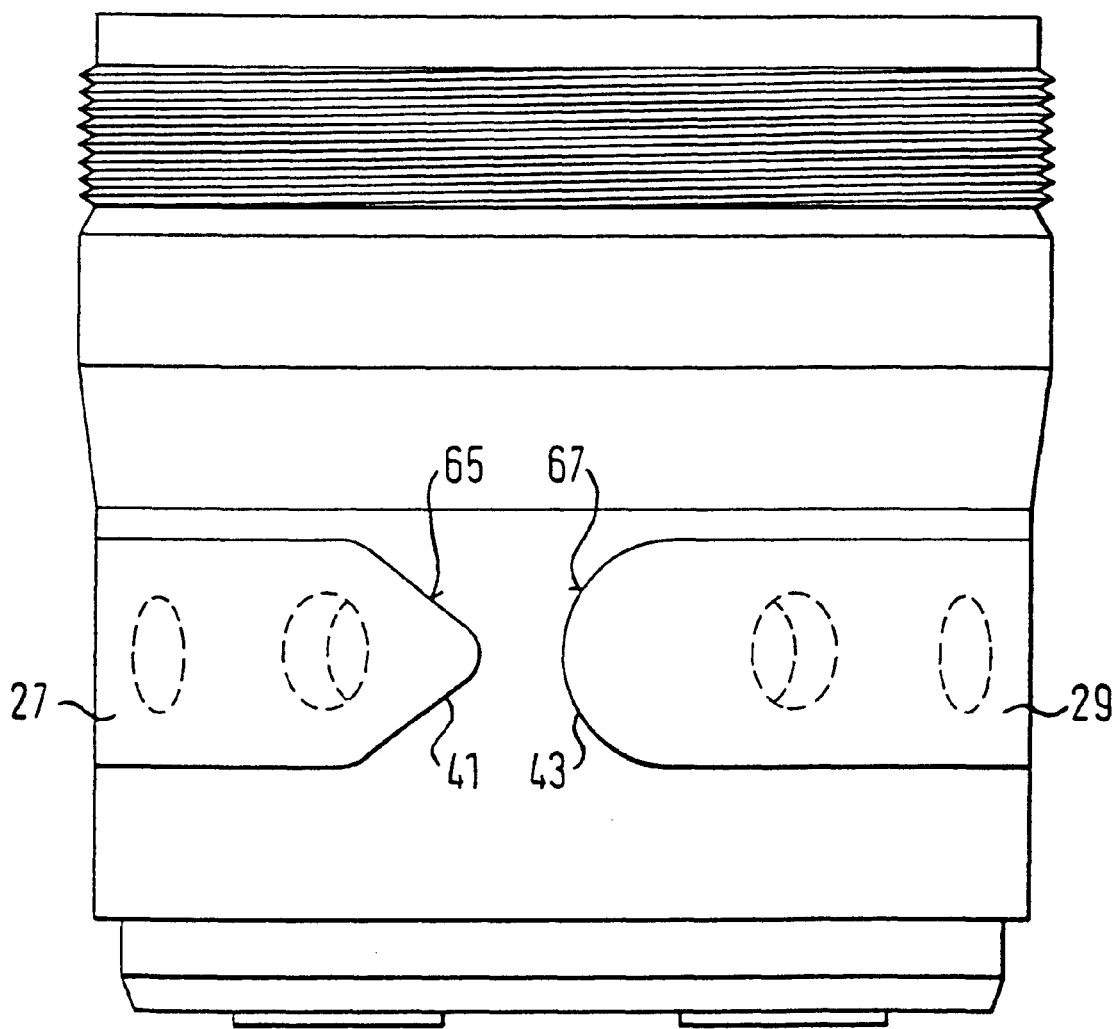
FIG. 8 shows a side view of the combustion chamber insert of the gas generator according to a seventh and an eighth embodiment.

In the embodiments shown in FIG. 8 the membrane is open in the peripheral direction. The protective device is realized in that the shown peripheral ends of the membrane, i.e. the edges 41, 43 of the membrane 27, 29 are designed so as to be favorable with respect to flow.

In the left half of FIG. 8, the end wall 41 has two chamfered portions 65 running towards each other, which end in a blunt point. In the right half of FIG. 8, the end wall 43 shows a rounding 67 approximately in the form of a circular arc. In both cases, the chamfered portion 65 or rounding 67 extends across the entire axial length of the end wall 41, 43.

This chamfered portion 65 and rounding 67, respectively, serves to protect the end wall 41, 43 of the membrane 27, 29 from coming off through a reduction of the resistance offered to the gas stream.

What is claimed is:

1. A gas generator comprising:
   at least two combustion chambers filled with propellant charges and delimited by combustion chamber walls,
   said combustion chamber walls having outflow openings which in a non-activated state are closed by at least one applied membrane having an edge, at least one protective foil defining an additional part separate from said membrane being provided which covers only said edge of said membrane from an outer side of said membrane and which leaves said outflow openings at least partially uncovered, said protective foil preventing a coming off of said edge from said combustion chamber wall.

2. The gas generator according to claim 1 wherein said combustion chamber wall has an outer side facing away from said propellant charge and said membrane is fastened on said outer side of said combustion chamber wall.

3. The gas generator according to claim 1 wherein said protective foil is a ductile metal foil.

4. The gas generator according to claim 1 wherein said gas generator has a longitudinal axis and said membrane has axially running edges, said protective foil covering at least one of said axially running edges.

5. The gas generator according to claim 1 wherein one membrane per combustion chamber is provided which covers the outflow openings associated with said combustion chamber.

6. The gas generator according to claim 4 wherein two protective foils are provided which each cover one axially running edge of said membrane.

7. The gas generator according to claim 1 wherein said membrane surrounds said combustion chamber walls peripherally at least partially.

8. A gas generator comprising:

at least two combustion chambers filled with propellant charges and delimited by combustion chamber walls, said combustion chamber walls having outflow openings which in a non-activated state are closed by at least one applied membrane having an edge, at least one protective foil defining an additional part separate from said membrane being provided which covers only said edge of said membrane from an outer side of said membrane, said protective foil not being destroyed upon activation of said gas generator and said protective foil preventing a coming off of said edge from said combustion chamber wall upon activation of said gas generator.

9. A gas generator comprising:

at least two combustion chambers filled with propellant charges and delimited by combustion chamber walls, said combustion chamber walls having outflow openings associated with the respective combustion chambers which in a non-activated state are closed by at least one applied membrane having an edge, said membrane having such a high stability that said membrane portion which covers an outflow opening is only destroyed by an ignition of the propellant in said combustion chamber associated with said respective outflow opening and remains in a position covering said outflow opening when an ignition of the propellant in said other combustion chamber occurs, at least one protective foil defining an additional part separate from said membrane and covering at least sections of said edge of said membrane from an outer side of said membrane being provided, said protective foil preventing a coming off of said edge from said combustion chamber wall.

* * * * *